US008363821B2

(12) United States Patent
Suzuki et al.

(10) Patent No.: US 8,363,821 B2
(45) Date of Patent: Jan. 29, 2013

(54) APPARATUS AND METHOD FOR CANCELING ECHO

(75) Inventors: Kaoru Suzuki, Kanagawa-ken (JP);
Koichi Yamamotop, Tokyo (JP);
Tadashi Amada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 12/880,772

(22) Filed: Sep. 13, 2010

(65) Prior Publication Data
US 2011/0243318 A1    Oct. 6, 2011

(30) Foreign Application Priority Data

Mar. 31, 2010 (JP) ................................. 2010-084318

(51) Int. Cl.
*H04M 9/08* (2006.01)
(52) U.S. Cl. .............................. 379/406.03; 379/406.08
(58) Field of Classification Search ............. 379/406.03, 379/406.08, 406.01, 406.02, 406.09
See application file for complete search history.

(56) References Cited

U.S. PATENT DOCUMENTS

| 2007/0092074 | A1* | 4/2007 | Takada ...................... 379/406.08 |
| 2007/0206777 | A1* | 9/2007 | Fadili et al. .............. 379/406.01 |
| 2007/0280472 | A1* | 12/2007 | Stokes III et al. ........ 379/406.01 |
| 2008/0292093 | A1* | 11/2008 | Son .......................... 379/406.01 |
| 2009/0116638 | A1* | 5/2009 | Gough et al. ............. 379/406.09 |
| 2009/0245502 | A1* | 10/2009 | Liu .......................... 379/406.08 |
| 2009/0257579 | A1* | 10/2009 | Takada ...................... 379/406.08 |
| 2010/0002866 | A1* | 1/2010 | Ozawa ...................... 379/406.06 |
| 2010/0104091 | A1* | 4/2010 | Yue et al. .................. 379/406.08 |

FOREIGN PATENT DOCUMENTS

| JP | 01-135132 | 5/1989 |
| JP | 2003-324370 | 11/2003 |
| JP | 3877271 | 2/2007 |
| JP | 2008-252510 | 10/2008 |
| WO | 2010110071 A1 | 9/2010 |

OTHER PUBLICATIONS

Japanese Office Action for Japanese Application No. 2010-084318 mailed on Mar. 9, 2012.

* cited by examiner

*Primary Examiner* — Olisa Anwah
(74) *Attorney, Agent, or Firm* — Turocy & Watson, LLP

(57) ABSTRACT

According to one embodiment, in response to a first acoustic signal output, a second acoustic signal is input. A filter unit is configured to generate a third acoustic signal by convoluting the first acoustic signal with coefficients. A subtraction unit is configured to generate a fourth acoustic signal by subtracting the third acoustic signal from the second acoustic signal. An estimation unit is configured to decide whether a sound volume of the first acoustic signal is below a predetermined threshold, and to set a sound volume of the second acoustic signal as a non-echo sound level when the sound volume of the first acoustic signal is below the predetermined threshold. A determination unit is configured to determine a step size to correct the coefficients using the non-echo sound level. A correction unit is configured to correct the coefficients using the step size.

5 Claims, 5 Drawing Sheets

US 8,363,821 B2

APPARATUS AND METHOD FOR CANCELING ECHO

CROSS-REFERENCE TO RELATED APPLICATION

This application is based upon and claims the benefit of priority from Japanese Patent Application No. 2010-084318, filed on Mar. 31, 2010; the entire contents of which are incorporated herein by reference.

FIELD

Embodiments described herein relate generally to an apparatus and a method for canceling echo.

BACKGROUND

An echo cancellation apparatus to suppress "acoustic echo" is well known. For example, a speech of a far-end terminal (other terminal) is output from a loud speaker of a near-end terminal (local terminal). Sound waves emitted from the loud speaker are reflected from surrounding objects. A part of them arrive at a microphone of the near-end terminal. It is an acoustic echo. The acoustic echo is captured by the microphone and sent back to the far-end terminal. A far-end speaker hears the echo of his/her own speech with some delay. It causes that conversation is obstructed.

In this echo cancellation apparatus, by using an adaptive filter of which the number of coefficients is N, an echo replica signal y(t) (pseudo acoustic echo) is generated from a reference signal x(t) (a first acoustic signal), which is the received signal of the far-end speech.

From an input signal m(t) (a second acoustic signal) input to the microphone of the near-end terminal and the echo replica signal y(t) (a third acoustic signal), an error signal e(t) (a fourth acoustic signal) is generated using equations (1) and (2). The error signal e(t) is output from a loud speaker of the far-end terminal.

$$e(t) = m(t) - y(t) \quad (1)$$

$$y(t) = \sum_{k=0}^{N-1} (w(k,t) \cdot x(t-k))$$
$$= W(t)^T X(t) \quad (2)$$

The equation (2) represents convolution. "w(k,t)" is k-th coefficient at time t in the adaptive filter. "x(t−k)" is the first acoustic signal at time (t−k).

"W(t)" is a column vector of the coefficients represented by an equation (3). "X(t)" is a column vector of a reference signal represented by an equation (4).

$$W(t) = [w(0,t), w(1,t), \ldots, w(N-1, t)]^T \quad (3)$$

$$X(t) = [x(t), x(t-1), \ldots, w(t-N+1)]^T \quad (4)$$

In the echo cancellation apparatus, by using an adaptive algorithm (For example, LMS algorithm represented by an equation (5)), coefficients w (k,t) are corrected (updated in real time).

$$W(t+1) = W(t) + \mu \cdot e(t) \cdot X(t) \quad (5)$$

In the equation (5), "μ" is a parameter to determine a degree to correct coefficients of the adaptive filter, which is called a step size. If the step size μ is large, when the second acoustic signal m(t) includes only acoustic echo of the first acoustic signal x(t), the coefficients w(k,t) can be quickly converged, and the acoustic echo can be quickly suppressed.

However, when the second acoustic signal m(t) includes other signals such as environmental noise or near-end speaker's voice), the coefficients w(k,t) are miss-corrected, and the acoustic echo cannot be suppressed enough.

Accordingly, for example, as to the echo cancellation apparatus disclosed in JP No. 3877271, it is assumed that a sound volume of the second acoustic signal m(t) becomes larger when the other signals except for the acoustic echo are included in the second acoustic signal m(t). Under this assumption, the step size μ is set to be smaller for preventing the miss-correction.

However, in this echo cancellation apparatus, even if the other signals are not included in the second acoustic signal m(t), the step size μ is also set to be smaller needlessly when a sound volume of the acoustic echo becomes large. As a result, the acoustic echo sometimes cannot be suppressed quickly.

DETAILED DESCRIPTION

Figure 1:
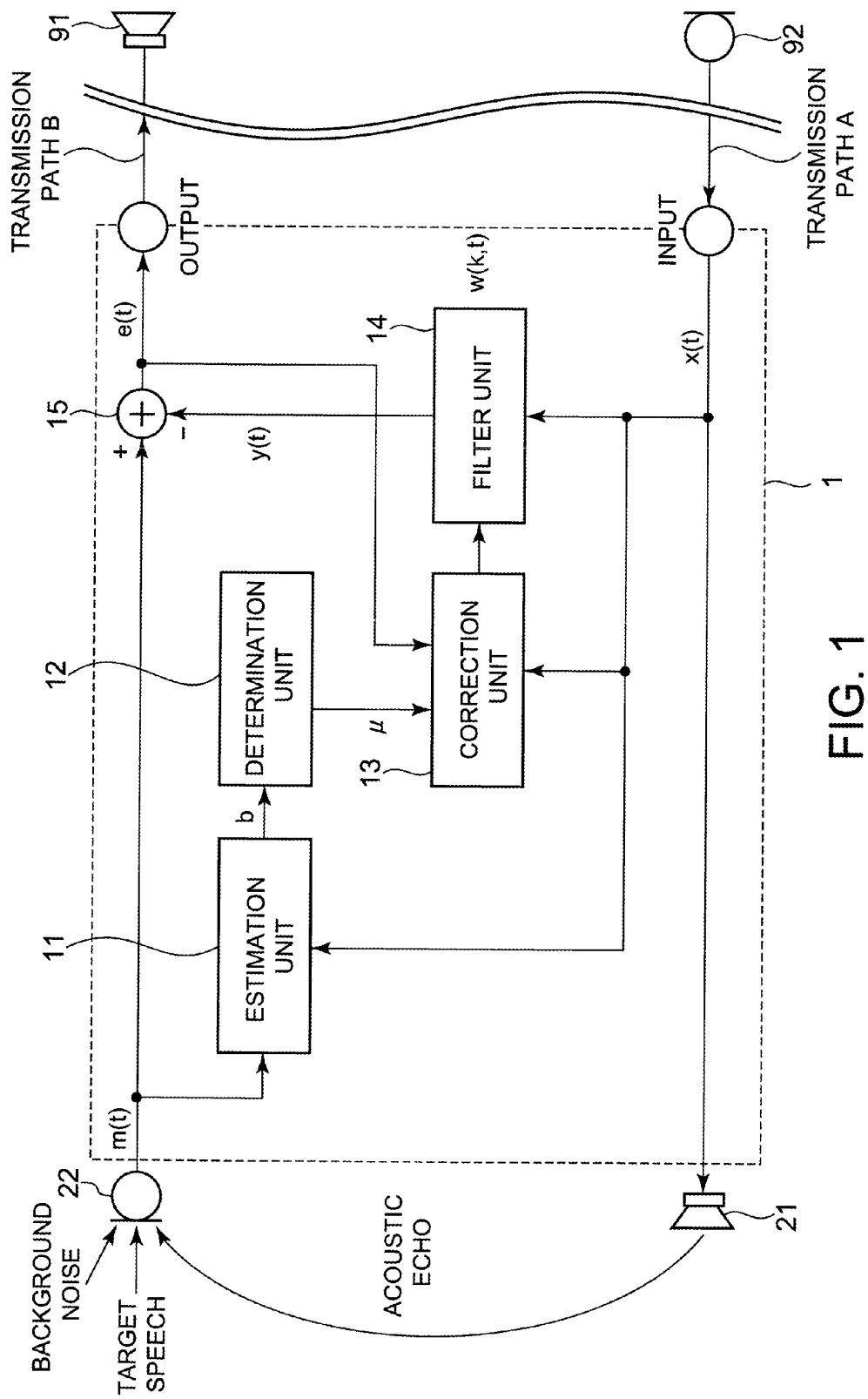
FIG. 1 is a block diagram of an echo cancellation apparatus 1 according to a first embodiment.

In general, according to one embodiment, an echo cancellation apparatus includes an output unit, an input unit, a filter unit, a subtraction unit, an estimation unit, a determination unit, and a correction unit. The output unit is configured to output a first acoustic signal. The input unit is configured to input a second acoustic signal in response to the first acoustic signal. The filter unit is configured to generate a third acoustic signal by convoluting the first acoustic signal with a coefficient. The subtraction unit is configured to generate a fourth acoustic signal by subtracting the third acoustic signal from the second acoustic signal. The estimation unit is configured to decide whether a sound volume of the first acoustic signal is below a predetermined threshold, and to set a sound volume of the second acoustic signal as a non-echo sound level when the sound volume of the first acoustic signal is below the predetermined threshold. The determination unit is configured to determine a step size to correct the coefficients using the non-echo sound level. The correction unit is configured to correct the coefficients using the step size.

Hereinafter, embodiments of the present invention will be explained by referring to the drawings. The present invention is not limited to the following embodiments.

The First Embodiment

As shown in FIG. 1, for example, the echo cancellation apparatus 1 is used for a communication device (such as a telephone) aiming at telephone call.

In a system having a loud speaker 21 and a microphone 22 at near location, an acoustic echo from the loud speaker 21 is often captured by the microphone 22. In order to suppress such acoustic echo (roundly captured), the first embodiment is suitably applied.

The loud speaker 21 and the microphone 22 are connected to the echo cancellation apparatus 1. A first acoustic signal x(t) is input to the echo cancellation apparatus 1 via a transmission path A. For example, the first acoustic signal x(t) is a speech of a far-end speaker (not shown in FIG. 1), and input from a far-end microphone 92 via the transmission path A. The loud speaker 21 outputs the first acoustic signal x(t) as a speech.

Furthermore, the microphone 22 inputs a captured speech as the second acoustic signal m(t) to the echo calculation apparatus 1. The second acoustic signal m(t) often includes a speech (target speech) uttered by a speaker (not shown in FIG. 1), a background noise, and an acoustic echo of the first acoustic signal x(t). The echo cancellation apparatus 1 outputs an error signal e(t) which the acoustic echo is suppressed from the second acoustic signal m(t) via a transmission path B. For example, the echo cancellation apparatus 1 outputs the error signal e(t) to a far-end loud speaker 91 via the transmission path B.

As to the echo cancellation apparatus 1, a step size μ is controlled based on the second acoustic signal m(t), when it is decided that the acoustic echo is not included in the second acoustic signal m(t).

The echo cancellation apparatus 1 measures a sound volume of the first acoustic signal x(t) inputted. If the sound volume is below a predetermined threshold, the step size μ is controlled based on the sound volume of the second acoustic signal m(t). An echo replica signal y(t) is generated using the controlled step size μ. From the second acoustic signal m(t) and the echo replica signal y(t), an error signal e8t9 is generated using the equation (1). Last, the error signal e(t) is output.

The echo cancellation apparatus 1 includes an estimation unit 11, a determination unit 12, a correction unit 13, a filter unit 14, and a subtraction unit 15. The first acoustic signal x(t) is supplied to the loud speaker 21, the estimation unit 11, the correction unit 13 and the filter unit 14. The second acoustic signal m(t) is supplied to the estimation unit 11 and the subtraction unit 15.

The filter unit 14 convolutes the first acoustic signal x(t) with coefficients w(k,t) using the equation (2), and generates the echo replica signal y(t). The subtraction unit 15 generates the error signal e(t) using the equation (1), from the second acoustic signal m(t) and the echo replica signal y(t).

The estimation unit 11 decides whether a sound volume Px(t) of the first acoustic signal x(t) is below a predetermined threshold. When the sound volume is below the predetermined threshold, the estimation unit 11 sets a sound volume Pm(t) of the second sound acoustic signal m(t) to non-echo sound level b, and supplies the non-echo sound level b to the determination unit 12. The determination unit 12 determines a step size u based on the non-echo level b.

As to coefficients w (k,t+1) used by the filter unit 14 to generate an echo replica signal y(t+1) at a next time, the correction unit 13 corrects the coefficients using the step size μ. The correction unit 13 and the filter unit 14 comprise an adaptive filter of which the number of coefficients is N.

The estimation unit 11, the determination unit 12, the correction unit 13, the filter unit 14 and the subtraction unit 15 may be realized as a CPU (Central Processing Unit) and a memory used by the CPU.

Moreover, in the first embodiment, a time "t" is represented as a product of a sampling interval and the number of sampling. Briefly, the time "t" is equivalent to the number of sampling of input signals, i.e., a time index representing a discrete time (represented by the product of the sampling interval and the number of sampling).

The estimation unit 11 calculates the sound volume Px(t) of the first acoustic signal x(t) and the sound volume Pm(t) of the second acoustic signal m(t) using equations (6) and (7).

$$Px(0)=x^2(0)$$

$$Px(t)=\alpha \cdot x^2(t)+(1-\alpha) \cdot Px(t-1) \quad (6)$$

$$Pm(0)=m^2(0)$$

$$Pm(t)=\alpha \cdot m^2(t)+(1-\alpha) \cdot Pm(t-1)$$

$$Px(0)=|x(0)|$$

$$Px(t)=\alpha \cdot |x(t)|+(1-\alpha) \cdot Px(t-1) \quad (7)$$

$$Pm(0)=|m(0)|$$

$$Pm(t)=\alpha \cdot |m(t)|+(1-\alpha) \cdot Pm(t-1)$$

In the equations (6) and (7), α is a coefficient to satisfy "(0<α<1)". For example, α is 0.95. x(0) is an initial value of the first acoustic signal x(t). m(0) is an initial value of the second acoustic signal m(t).

Figure 2:
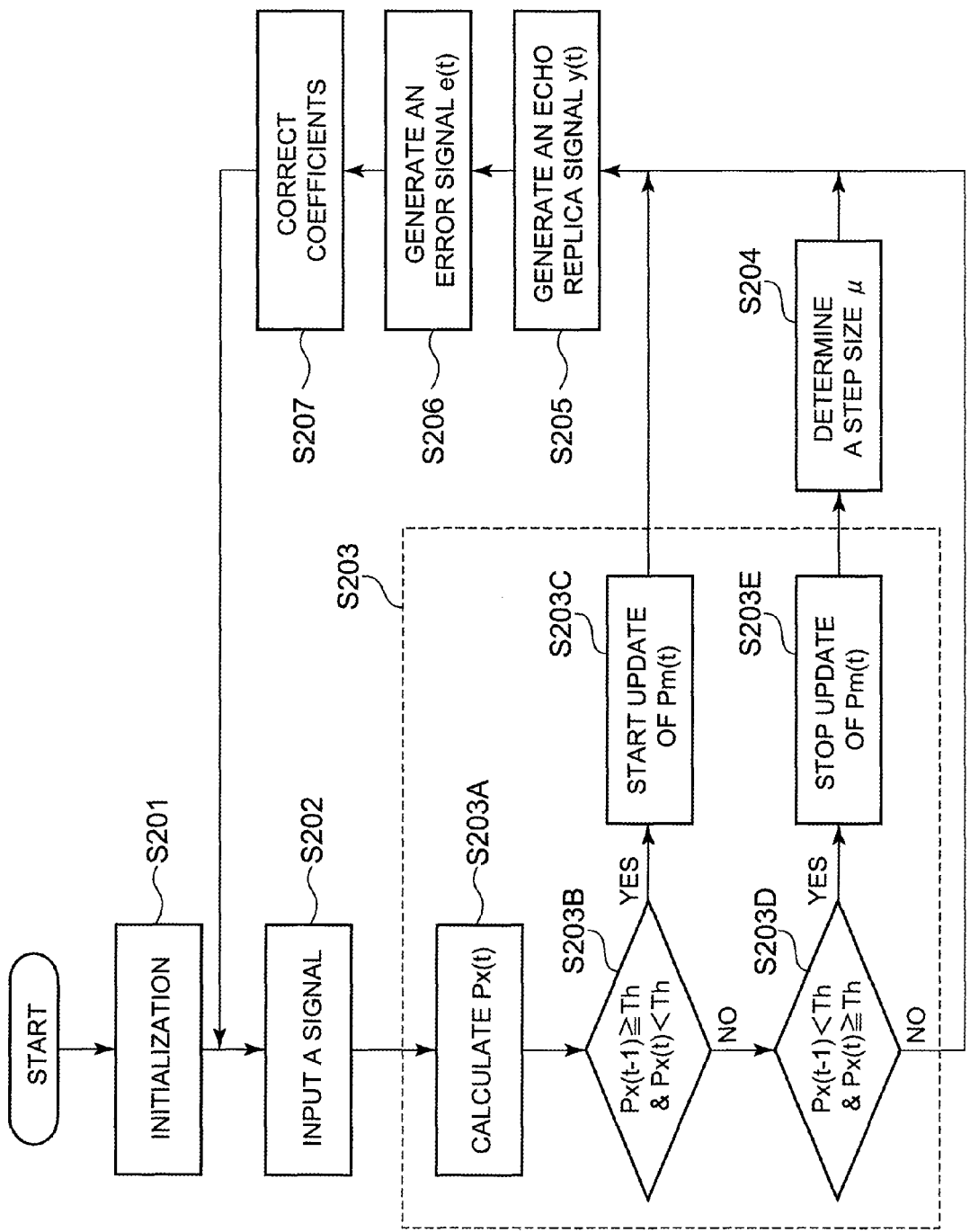
FIG. 2 is a flow chart of processing of the echo cancellation apparatus.

As shown in a flow chart of FIG. 2, when operation of the echo cancellation apparatus 1 starts, the filter unit 14 initializes the coefficients w(k,t) and the step size μ to a predetermined value respectively (S201). For example, the filter unit 14 initializes the coefficients w(k.0) to "0", and initializes the step size to μ max. The filter unit 14 may previously store the coefficients w(k,t) in a memory (not shown in FIG. 1).

When the first acoustic signal x(t) is input via the transmission path A, the loud speaker 21 outputs the first acoustic signal x(t). On the other hand, the microphone 22 supplies the second acoustic signal m(t) to the estimation unit 11 and the subtraction unit 15 (S202).

When a sound volume Px(t) of the first acoustic signal x(t) is below a predetermined threshold Th, the estimation unit 11 sets a sound volume Pm(t) of the second acoustic signal m(t) to new non-echo level b (S203). When the sound volume Px(t) of the first acoustic signal x(t) is not below the predetermined threshold Th, the estimation unit 11 does not change the sound volume Pm(t) of the second acoustic signal m(t). This processing is explained in detail afterwards.

Based on the non-echo level b, the determination unit 12 determines the step size μ (S204). The determination unit 12 supplies the step size μ (determined) to the correction unit 13.

From the first acoustic signal x(t), the filter unit 14 generates the echo replica signal y(t) using the equation (2) (S205). The filter unit 14 supplies the echo replica signal y(t) to the subtraction unit 15.

From the second acoustic signal m(t) and the echo replica signal y(t), the subtraction unit 15 generates the error signal e(t) using the equation (1) (S206). The subtraction unit 15 supplies the error signal e(t) to the correction unit 13. Furthermore, the subtraction unit 15 outputs the error signal e(t) via the transmission path B.

As to coefficients w(k,t+1) used by the filter unit 14 to generate an echo replica signal y(t+1) at a next time, the correction unit 13 corrects the coefficients using the step size μ. Briefly, based on the coefficients w (k,t) at the present time (t), the step size μ, the error signal e(t) and the first acoustic signal x(t), the correction unit 13 calculates coefficients w(k, t+1) at time (t+1) (used by the filter unit 14) by the equation (5), i.e., updates the coefficients w(k,t) to the coefficients (w,t+1).

Next, processing of step S203 is explained in detail. By using the equations (6) and (7), the estimation unit 11 calculates the sound volume Px(t) of the first acoustic signal x(t) (S203A). Next, the estimation unit 11 decides whether Px(t) has changed from "not below Th" to "below Th" (S203B). Briefly, in case of "Px (t−1)>=Th" & "Px(T)<Th", the estimation unit 11 decides that Px(t) has changed from "not below Th" to "below Th".

If the estimation unit 11 decides that Px(t) has changed from "not below Th" to "below Th" (Yes at S203B), the estimation unit 11 starts background processing to update the sound volume Pm(t) of the second acoustic signal m(t) using the equation (6) or (7) (S203C). Then, the processing is forwarded to S205.

If the estimation unit 11 decides that Px(t) has not changed from "not below Th" to "below Th" (No at S203B), the estimation unit 11 decides whether Px(t) has changed from "below Th" to "not below Th" (S203D). Briefly, in case of "Px(t−1)<Th" & "Px(T)>=Th", the estimation unit 11 decides that Px(t) has changed from "below Th" to "not below Th".

If the estimation unit 11 decides that Px(t) has not changed from "below Th" to "not below Th" (No at S203D), processing is forwarded to S205. If the estimation unit 11 decides that Px(t) has changed from "below Th" to "not below Th" (Yes at S203D), the estimation unit 11 stops the background processing to update Pm(t) (S203E). The estimation unit 11 sets the present value of Pm(t) to non-echo sound level b. The estimation unit 11 supplies the non-echo sound level b to the determination unit 12. The determination unit 12 determines a step size μ based on the non-echo sound level b (S204).

The non-echo sound level b (estimated by the estimation unit 11) and the step size μ (determined by the determination unit 12) are explained. By using an equation of the step size μ to monotonously decrease based on the non-echo sound level b, the determination unit 12 determines the step size μ from the non-echo sound level b.

Figure 3A:
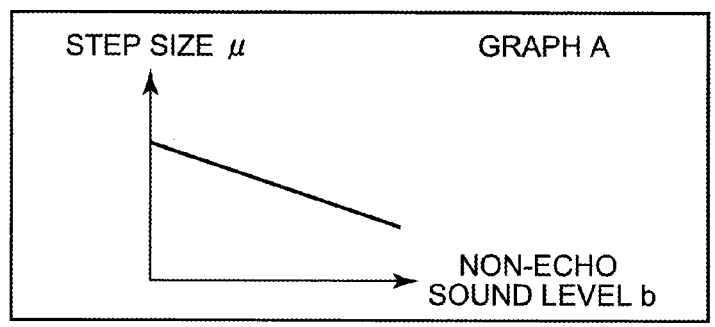
FIGS. 3A~3D are graphs showing relationship between non-echo sound level b and step size μ.

For example, as shown in FIG. 3A, by using the equation of the step size μ to linearly decrease based on the non-echo sound level b, the determination unit 12 may determine the step size μ from the non-echo sound level b.

Figure 3B:
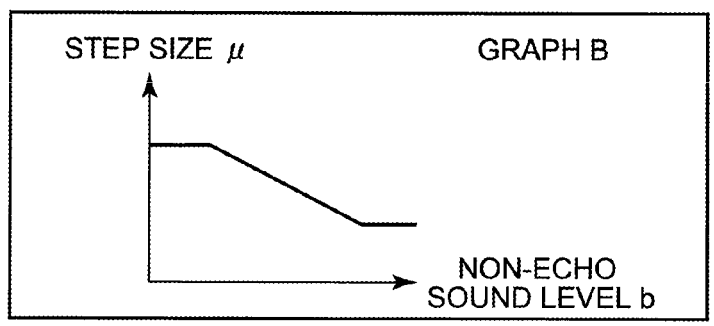

As shown in FIG. 3B, by using the equation of the step size μ to fix in a low value range and a high value range of the non-echo sound level and to linearly decrease between the low value range and the high value range, the determination unit 12 may determine the step size μ from the non-echo sound level b.

Figure 3C:
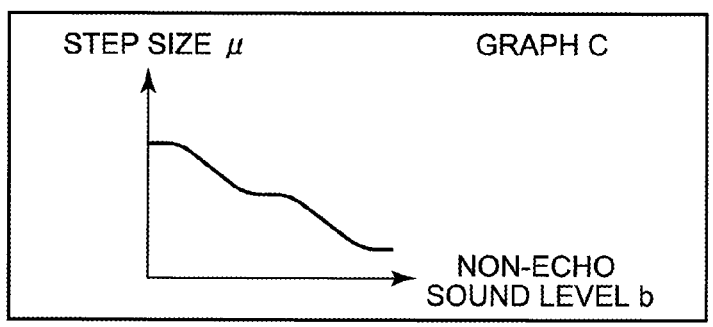

As shown in FIG. 3C, by using the equation of the step size μ to decrease with inflection points, the determination unit 12 may determine the step size μ from the non-echo sound level b.

Figure 3D:
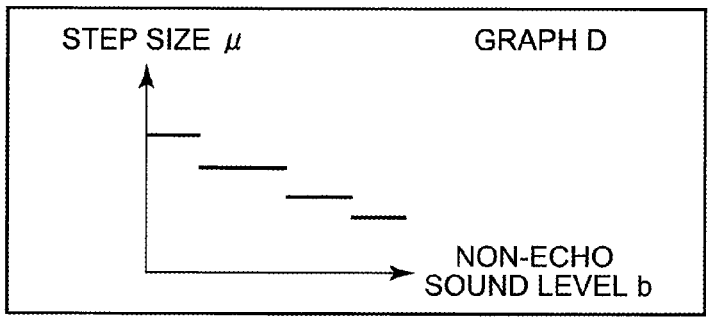

As shown in FIG. 3D, by using the equation of the step size μ to decrease stepwise, the determination unit 12 may determine the step size μ from the non-echo sound level b.

Furthermore, by using not the equation but a table to determine the step size μ corresponding to the non-echo sound level b, the determination unit 12 may determine the step size μ from the non-echo sound level b.

In the first embodiment, the acoustic echo can be suppressed with high accuracy.

In the first embodiment, as an adaptive algorithm to correct column vector W(t) of coefficients, LMS algorithm represented as the equation (5) is used. However, the adaptive algorithm is not limited to LMS algorithm. For example, NLMS algorithm may be used. Briefly, various algorithms to control the coefficients based on the step size μ can be used.

Furthermore, in the first embodiment, an example to suppress the acoustic echo is explained. However, the echo cancellation apparatus is not limited to this example. For example, as to not the acoustic echo but a circuit echo occurred along the transmission path, the circuit echo can be suppressed by the same processing.

Figure 4:
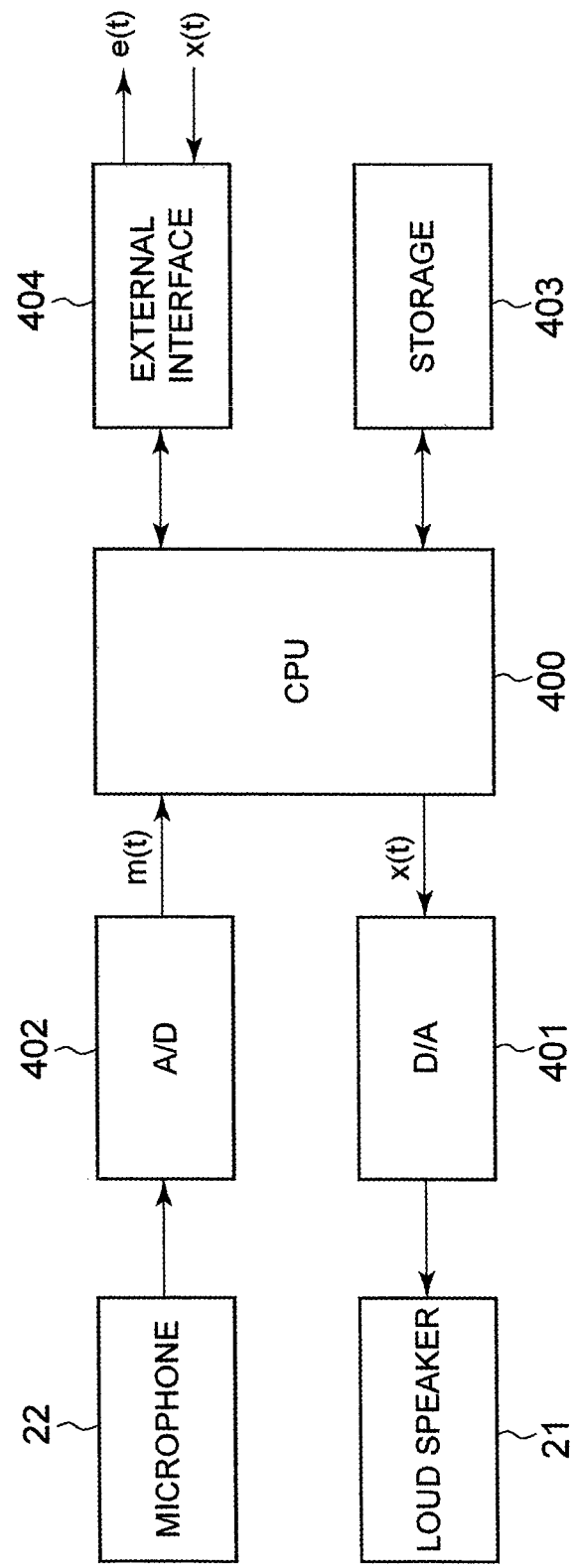
FIG. 4 is a block diagram of hardware component of the first embodiment.

Moreover, in the first embodiment, the echo cancellation apparatus may be executed as a program to execute above-mentioned processing. For example, as shown in FIG. 4, the program is stored in storage 403. The first acoustic signal x(t) is input to a CPU 400 from the outside via the external interface 404. The CPU 400 supplies the first acoustic signal x(t) to a D/A converter 401. The D/A converter 401 converts the first acoustic signal x(t) from digital to analog. The first acoustic signal x(t) converted is output from the loud speaker 21. As to an acoustic signal input to the microphone 22, an A/D converter 402 converts the acoustic signal from analog to digital. The converted acoustic signal is supplied as the second acoustic signal m(t) to the CPU 400.

The CPU 400 reads the program from the storage 403, and generates an error signal e(t) by echo cancellation processing of the first embodiment. The error signal e(t) is output to the outside via the external interface 404. Moreover, a memory to store various input/output signals and various data generated during executing the program is equipped in the CPU 400. Furthermore, the storage 403 to store the program may be attachable as a memory medium.

The Second Embodiment

As to the second embodiment, the echo cancellation apparatus 2 is connected to a speech dialogue device 50 having a talk-switch 500. By pushing the talk-switch 500, the speech dialogue device 50 inputs a guidance speech (the first acoustic signal x(t)) to the echo cancellation apparatus 2. The guidance speech is output from the loud speaker.

After pushing the talk-switch 500, a speaker (person: not shown in FIG. 5) inputs a speech to the microphone 22. Regularly, according to the guidance speech output from the loud speaker 21, the speaker inputs a speech to the microphone 22. In this case, while outputting the guidance speech from the loud speaker 21 (or immediately after outputting the guidance speech), when the speaker (person) inputs a speech to the microphone 22, the second acoustic signal m(t) (input from the microphone 22 to echo cancellation apparatus 2) often includes an acoustic echo of the guidance speech (the first acoustic signal x(t)).

In the echo cancellation apparatus 2, the estimation unit 11 determines non-echo sound level b based on push of the talk-switch 500. This feature is different from the first embodiment.

Figure 5:
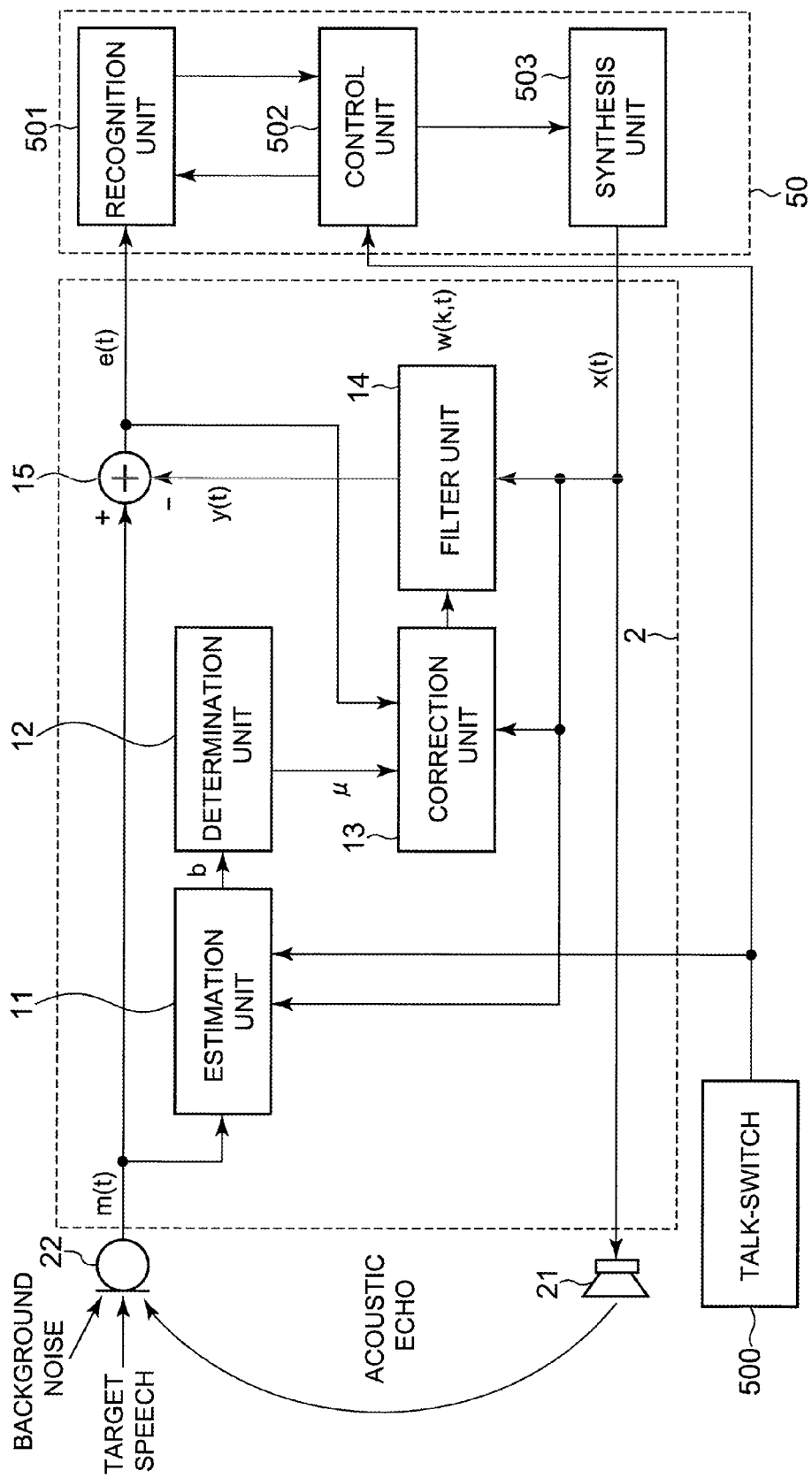
FIG. 5 is a block diagram of an echo cancellation apparatus 2 according to a second embodiment.

As shown in FIG. 5, the echo cancellation apparatus 2 is connected to the speech dialogue device 50. The speech dialogue device 50 includes a recognition unit 501, a control unit 502, a synthesis unit 503, and the talk-switch 500.

When the speaker (person: not shown in FIG. 5) pushes the talk-switch 500, the control unit 502 detects this operation. The control unit 502 controls the synthesis unit 503 to synthesize a guidance speech. The synthesis unit 503 inputs the guidance speech to the echo cancellation apparatus 2. An acoustic signal of the guidance speech corresponds to the first acoustic signal x(t) in the first embodiment.

Furthermore, by pushing the talk-switch 500, the recognition unit 501 starts to input an error signal e(t) which the acoustic echo of the first acoustic signal x(t) is suppressed from the second acoustic signal m(t) (captured by the microphone 22). The recognition unit 501 recognizes the error signal e(t). Based on a recognition result of the error signal e(t) by the recognition unit 501, the control unit 502 executes various processing.

From a timing when the talk-switch 500 is pushed, the estimation unit 11 measures a sound volume Pm(t) of the second acoustic signal m(t) (captured by the microphone 22) and a sound volume Px(t) of the first acoustic signal x(t). When the sound volume Px(t) is above a predetermined threshold, the estimation unit 11 sets the sound volume Pm(t) to non-echo sound level b. As to a period from a timing when the talk-switch is pushed to a timing when the sound volume Px(t) is above the predetermined threshold, this period represents that the echo cancellation apparatus is under a status of non-echo sound. Accordingly, under this status, the step size µ is determined based on the sound volume Pm(t).

As mentioned-above, in the second embodiment, even if the echo cancellation apparatus 2 is connected to the speech dialogue device 50, the acoustic echo can be suppressed with high accuracy.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An echo cancellation apparatus comprising:
   an output unit configured to output a first acoustic signal;
   an input unit configured to input a second acoustic signal in response to the first acoustic signal;
   a filter unit configured to generate a third acoustic signal by convoluting the first acoustic signal with coefficients;
   a subtraction unit configured to generate a fourth acoustic signal by subtracting the third acoustic signal from the second acoustic signal;
   an estimation unit configured to decide whether a sound volume of the first acoustic signal is below a predetermined threshold, and to set a sound volume of the second acoustic signal as a non-echo sound level, when the sound volume of the first acoustic signal is below the predetermined threshold;
   a determination unit configured to determine a step size to correct the coefficients using the non-echo sound level; and
   a correction unit configured to correct the coefficients using the step size.

2. The apparatus according to claim 1, wherein,
   when the sound volume of the first speech acoustic changed to be not below the predetermined threshold,
   the estimation unit supplies the non-echo sound level to the determination unit, and
   the determination unit determines the step size to be smaller when the non-echo sound level is larger.

3. An echo cancellation apparatus used for a speech dialogue device having a talk-switch, comprising:
   an output unit configured to output a first acoustic signal supplied from the speech dialogue device;
   an input unit configured to input a second acoustic signal from a speaker side in response to the first acoustic signal;
   a filter unit configured to generate a third acoustic signal by convoluting the first acoustic signal with coefficients;
   a subtraction unit configured to generate a fourth acoustic signal by subtracting the third acoustic signal from the second acoustic signal;
   an estimation unit configured to set a sound volume of the second acoustic signal as a non-echo sound level, when a sound volume of the first acoustic signal changed to be not below a predetermined threshold after the talk-switch was set to be "on";
   a determination unit configured to determine a step size to correct the coefficients using the non-echo sound level; and
   a correction unit configured to correct the coefficients using the step size.

4. The apparatus according to claim 3, wherein
   the determination unit determines the step size to be smaller when the non-echo sound level is larger.

5. An echo cancellation method comprising:
   outputting a first acoustic signal;
   inputting a second acoustic signal in response to the first acoustic signal;
   generating a third acoustic signal by convoluting the first acoustic signal with coefficients;
   generating a fourth acoustic signal by subtracting the third acoustic signal from the second acoustic signal;
   deciding whether a sound volume of the first acoustic signal is below a predetermined threshold;
   setting a sound volume of the second acoustic signal as a non-echo sound level, when the sound volume of the first acoustic signal is below the predetermined threshold;
   determining a step size to correct the coefficients using the non-echo sound level; and
   correcting the coefficients using the step size.

* * * * *